Aug. 23, 1927.
H. DE JONG
1,639,687
MACHINE FOR SECURING PLATE SHAPED ELECTRODES TO CARRIERS
Filed Dec. 15, 1923    2 Sheets-Sheet 1
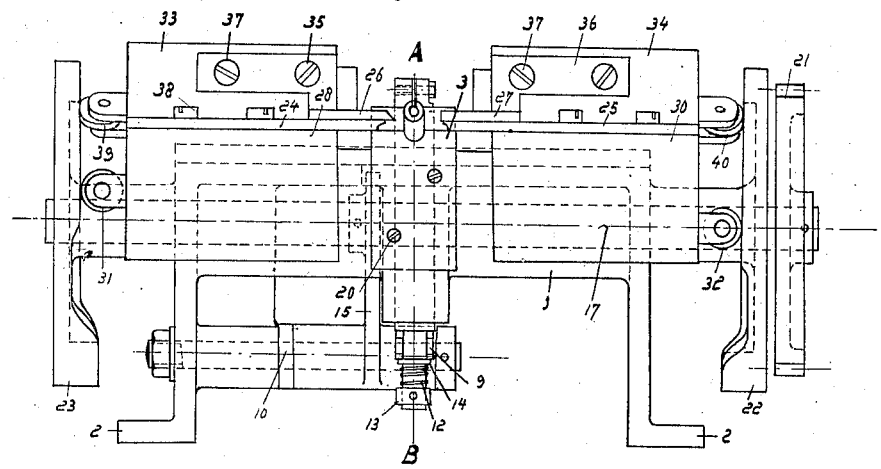
Inventor.
Hendrik de Jong.
E. T. & J. F. Brandenburg
Attorneys Aug. 23, 1927.
H. DE JONG
1,639,687
MACHINE FOR SECURING PLATE SHAPED ELECTRODES TO CARRIERS
Filed Dec. 15, 1923   2 Sheets-Sheet 2
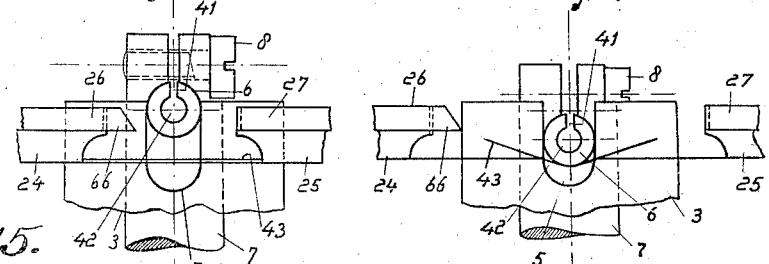
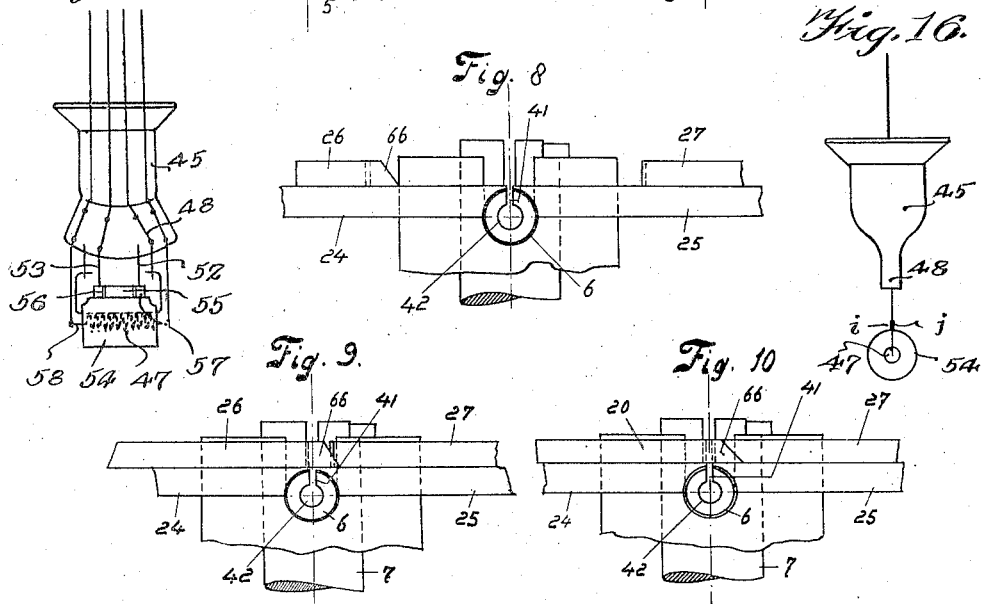
Inventor
Hendrik de Jong
E. T. & J. F. Brandenburg
attorneys Patented Aug. 23, 1927.

1,639,687

UNITED STATES PATENT OFFICE.

HENDRIK DE JONG, OF EINDHOVEN, NETHERLANDS, ASSIGNOR TO NAAMLOOZE VENNOOTSCHAP PHILIPS' GLOEILAMPENFABRIEKEN, OF EINDHOVEN, NETHERLANDS.

MACHINE FOR SECURING PLATE-SHAPED ELECTRODES TO CARRIERS.

Application filed December 15, 1923, Serial No. 680,998, and in the Netherlands December 22, 1922.

The present invention relates to a machine which is particularly adapted for shaping a thin metal plate into the desired form and attaching it to one or more carriers and is characterized by a device for keeping properly positioned the carriers, a mandrel the outer surface of which corresponds to the form into which the sheet is to be shaped, a number of dies for bending the plate around the mandrel, and a number of dies for pressing one or both of the ends of the bent sheet plate to the carriers.

In the machine according to the present invention one of the dies may also be provided with cutters for making incisions in the lateral sides of the metal plate adjacent one or both of the ends.

When in the machine according to the present invention the two ends of the bent plate are pressed against the carriers, they are as a rule at the same time partly bent around the carriers. The additional bending of one or of both of the ends of the plate around the carriers and the clamping of the same together with the carriers can easily be effected by hand. The machine according to the present invention may however by a slight constructive modification be arranged in such a manner that also the clamping of one or of both of the ends around the carriers is effected by the machine.

For this purpose the dies for pressing the ends of the bent plate against the carriers may according to the present invention be shaped in such a manner and moved in such succession that first the die arriving from one side presses one end of the plate against the carriers and bends the lateral sides of the said end around the carriers, and then the die arriving from the other side bends the said lateral sides further around the carriers, whereupon the ends are clamped around the carriers between the two dies, it being if desired possible for the other end of the plate to be clamped by this time between the carriers and the first mentioned end.

According to the present invention the mandrel may be reciprocatable, serving also for keeping the carriers properly positioned and being arranged opposite a stationary block on which it is possible for the plate to be bent to be laid, said block having a groove acting as a die, the other dies serving for bending and the dies serving for pressing being arranged on both sides of the mandrel to move normally to the direction of movement of the latter.

According to the present invention the mandrel and the movable dies may be driven in such a manner that first the mandrel presses the plate into the groove serving as a die, then two dies movable on both sides bend the plate entirely around the mandrel and lay the ends side by side, whereupon two other dies movable on both sides press the ends against the carriers.

During such operation the movable dies may separate so as to leave room for the bending of the plate by the mandrel.

The machine according to the present invention can easily be made adapted for attaching an anode to supporting wires mounted on a glass supporting member on which another electrode, for example the grid or various other electrodes are already found.

In order to keep the supporting wires serving for the attachment properly positioned the mandrel may according to the present invention be provided in this case with a central hole to receive the electrode already mounted on the glass supporting member and also with a slit for the passage and supporting of the supporting wires for the said electrode.

The accompanying drawing represents by way of example an embodiment of the machine according to the present invention and also a stem-mount of a discharge tube with three electrodes having the anode or plate attached in the manner according to the present invention. In the said drawings:

Figure 1 is a front view of the machine according to the present invention particularly adapted for attaching a cylindrical electrode to two supporting wires.

Fig. 2 is a sectional plan of the central portion of the machine.

Fig. 3 is a cross-section taken on the line A—B of Figure 1.

Fig. 4 is a longitudinal section taken on the line C—D of Figure 3 through the left portion of the machine.

Fig. 5 is a sectional plan of the right portion of the machine.

Figs. 6 to 12 inclusive represent on a slightly larger scale the various positions of the dies of the machine, Figures 6 to 10 inclusive showing the dies in front elevation and Figures 11 and 12 showing a plan of them.

Fig. 13 shows the stem for a discharge tube with three concentric electrodes prior to the attachment of the anode to their supporting wires.

Fig. 14 represents a plate shaped as inserted into the machine, and

Figs. 15 and 16 show a front and a side elevation respectively of a finished stem with three electrodes.

The machine shown in Figures 1 to 5 inclusive comprises a cast iron frame 1 resting on legs 2 and provided with bearings for shafts 10 and 17. A block 3 of steel or similar hard material is secured by means of studs 20 to the central portion of the frame 1. In the top of the said block is provided a semi-cylindrical groove 5 to receive a mandrel 6. The latter is vertically movable between two shoulders 4 on the top of the block 3 and is joined to a vertical shaft 7 owing to its extending through a hole of the said shaft, the latter being bifurcated at the top so as to permit of the mandrel 6 being clamped by means of a stud 8 in the shaft 7. The latter is vertically movable in the frame 1. This vertical movement is caused by a lever 15 the end of which engages the surface of a cam 16 which by means of a conical stud 18 is rigidly secured to the shaft 17. The shaft 17 which is rotatable in the frame 1 may be driven in any suitable manner for example by means of a toothed wheel 21 (Figure 1). The lever 15 is rotatable on the shaft 10 which is secured in the frame 1. A lever 9 is integral with the lever 15 being mounted on the same boss.

The swinging movement obtained by the lever 15 is consequently also imparted to the lever 9 and the movement of the latter is transmitted to the vertical shaft 7, as the lever 9 grips with its forked end around the shaft 7. The two legs of the fork engage at one side a shoulder on the shaft 7 and at the other side a ring 14 forced upwards by a spring 12. The latter engages at the other side a ring 13 rigidly secured by means of a conical stud 19 to the vertical shaft. The shaft 7 is normally held upwards by the helical spring 11, attached at its upper end to the frame 1 and at its lower end to the lever 9, intermediate of the ends thereof.

The mandrel serves for bending a plate laid on the upper surface of the block 3. For this purpose the plate is pressed with its central portion into the semi-cylindrical groove 5. Four dies 24, 25, 26 and 27 reciprocatable in horizontal direction provide for the additional shaping of the plate and its attachment to the supporting wires. It is possible for the dies 24 and 26 as well as for the dies 25 and 27 to slide independently in relation to each other. The dies 24 and 25 serve for making the plate cylindrical, whereas the dies 26 and 27 serve for attaching the plate to its supporting wires. The dies 24 and 25 are secured by means of screws 38 to slides 28 and 30. The said slides are movable along a dovetail 29 on the frame 1 as shown in Figure 3 and are properly reciprocated owing to rollers 31 and 32 (Figure 1) riding upon the circumference of end-thrust cams 23 and 22 seated on the shaft 17. The said rollers are resiliently forced against the cams. For the sake of clearness the springs required for this purpose are not shown in Figure 1. The spring serving for pressing laterally the left slide 28 is shown however in Figure 4. A helical spring 61 rests in a boring 62 in the frame 1 and engages with the other end a wall 60 of the slide 30. A spring for the slide 30 is provided in a similar manner.

The dies 26 and 27 are integral with blocks 35 and 36 (Figs. 1 and 2) which by means of screws 37 are secured to slides 33 and 34. The said slides are movable along a dovetail on the top of the frame 1. They are reciprocated owing to rollers 39 and 40 riding upon the circumference of the beforementioned cams 23 and 22 and again the rollers are forced against the cams by means of helical springs. The said springs are not shown in Figure 1, but the manner in which they are arranged is shown in Figure 5 from which it is apparent that a helical spring 65 rests in a boring 64 in the frame 1, and engages with the other end a portion 63 of slide 34. A spring for slide 34 is arranged in an entirely corresponding manner.

Before explaining more fully the operation of the machine the process of attaching the plate to its supporting wires will be described hereinafter by reference to Figures 13 to 16 inclusive. Figure 13 shows an unfinished stem for a tube having three electrodes arranged cylindrically and concentrically in relation to each other. The stem comprises a glass tube 45 closed at one side by a clamp portion 46 of the stem through which are sealed the various leading-in wires. Wires 50 and 51 are intended for carrying the filament. In the process of attaching herein described the said filament is not mounted until after the anode has been attached with the machine according to the present invention and for this purpose the wires 50 and 51 are first bent. However by a slight constructive modification it is possible for the machine according to the present invention to be made adapted for attaching the anode to a stem on which the filament as well as the grid have already been mounted. The grid 47 comprises a cylindrically wound wire secured in any suitable manner to a supporting wire 49. Supporting wires 52 and 53 are intended for carrying the anode. Figure 14 shows the metal plate to be constructed into an anode. The plate can easily be punched into the shape shown in Figure 14. In shaping the anode the portion between the lines *ef* and *gh* is bent cylindrically, whereas the rectangular parts *i* and *j* beyond the said lines serve for attaching the plate to the supporting wires 52 and 53. For this latter purpose the part *i* is slightly cut out along the line *ef* and the free lateral sides thus formed are bent around the supporting wires 52 and 53.

Figures 15 and 16 show a finished mount. The anode 54 is bent cylindrically. The ends of the anode plate *i* and *j* are applied against each other and the ends of the said parts are bent around the supporting wires 52 and 53 as indicated in Figure 15, at 56 and 57. The leading-in wires 50 and 51 for the filament are straightened and the filament 58 is mounted in the centre of the grid 47.

The sequence of operations of the machine according to the present invention will be described hereinafter more particularly by reference to Figures 6 to 12 inclusive.

The machine is shown in Figure 6 in the normal position. In the said position the plate 43 which is shaped for example as shown in Figure 14 is disposed on the block 3. Care should be taken that the said plate be disposed with the part *i* on the side of the die 26.

The various operations on the plate are effected during the time the shaft 17 (Figure 1) makes one complete revolution. The toothed wheel 21 may be suitably driven in such a manner that it makes every time one complete revolution but every time between two successive revolutions remains stationary for a predetermined period. The toothed wheel may also every time be interlocked and disengaged for example by means of a pedal, it being then possible for the operator to hold the machine stationary at any moment desired. It is obvious, of course, that the machine can also be driven by hand.

The plate 43 is, as observed hereinbefore, disposed in place during the periods the machine is stationary. A mount to which the anode is to be secured and which for example is shaped as shown in Figure 13, is also inserted in the machine. For this latter purpose a cylindrical hole 42 is provided in the mandrel 6 and a slit 41 is provided at the top of the said mandrel. The mount is slid with the grid 47 into the cylindrical hole 42 so that the supporting wires for the grid lie against the walls of the slot 41 whilst the supporting wires 52 and 53 for the anode will be located at a short distance above the said groove. By this time the machine is set in motion and the various dies move into the position shown in Figure 7 owing to the rollers 31, 32, 39 and 40 riding upon the end-thrust cams 22 and 23 and the end of the lever 15 riding upon the cam 16. The plate 43 is bent because of the lowering of the mandrel 6 and in order to permit of the said plate being bent the dies 24, 25, 26, 27 have moved backwards laterally. The mandrel 6 continues its downward movement until the central portion of the plate is entirely pressed into the semi-cylindrical groove 5. The dies 26 and 27 remain stationary but the dies 24 and 25 move toward each other and bend the sheet in such a manner that the latter receives a cylindrical shape, and the parts *i* and *j* will lie side by side. This position is shown in Figure 8.

As the shaft 17 continues its revolution the dies 26 and 27 are moved towards each other, the die 26 reaching the central position prior to the die 27.

Figures 9 and 11 show the position in which the die 26 has its extreme central position and the die 27 is still somewhat to the right. The cutters 66 and 67 on both sides respectively of the die 26 have by this time slightly cut in the part *i* of the sheet, the free lateral sides thus formed being bent at the same time.

Finally the die 27 in extreme position moves to the left, the lateral sides of the parts *i* and *j* of the plate being thereby bent around the supporting wires 52 and 53.

It may be observed that the plate 43 shown in the Figures 6 and 7 is for the sake of clearness left out in Figures 8 to 12 inclusive.

The bending of the lateral sides of the part *i* around the supporting wires may also be effected by hand. In this case it is possible to make the dies 26 and 27 arrive at the same time in the extreme central position.

It will be easily possible for any person skilled in the art to make the machine adapted for manufacturing and attaching electrodes of any shape other than that hereinbefore described.

Thus for example it is possible by modification of the shape of the dies 6, 24 and 25 and of the groove 5 to construct elliptically or rectangularly bent electrodes.

It is also obvious, of course, that the machine according to the present invention is applicable to many purposes other than attaching electrodes in discharge tubes.

What I claim is:—

1. A machine for bending thin metal plates and for attaching them to carrier-wires comprising a mandrel having a bore and slot communicating with said bore, the outer surface of said mandrel corresponding with the form into which the plate is to be shaped, dies movable to bend the plate around the mandrel, and additional dies movable to press the ends of the bent plate around the carrier wires.

2. A machine for bending thin metal plates and for attaching them to carrier-wires comprising a mandrel having a bore and slot communicating with said bore, the outer surface of said mandrel corresponding with the form into which the plate is to be shaped, dies movable to bend the plate around the mandrel, additional dies movable to press the ends of the bent plate around the carrier-wires, and a cutter carried by one of said dies for making incisions in the lateral sides of the plate adjacent at least one end thereof.

3. A machine for bending thin metal plates and for attaching them to carrier-wires comprising a mandrel having a bore and slot communicating with said bore, the outer surface of said mandrel corresponding with the form into which the plate is to be shaped, dies movable to bend the plate around the mandrel, additional dies movable to press the ends of the bent plate around the carrier-wires, and cam means for actuating the two sets of dies successively.

4. A machine for bending thin metal plates and for attaching them to carrier-wires comprising a mandrel having a bore and slot communicating with said bore, the outer surface of said mandrel corresponding with the form into which the plate is to be shaped, means for bending the plate around the mandrel, two dies one of which is movable to bend the lateral sides of one end of the plate around the carrier-wires, and the other being movable to bend the said lateral sides further around the said carrier-wires, and cam means for actuating said two dies successively.

5. A machine for bending thin metal plates and for attaching them to carrier-wires comprising a mandrel having a bore and slot communicating with said bore operable to initially bend the plate and then temporarily hold the same, a stationary die, having a recess in its top, in the path of movement of said mandrel, and means for pressing the ends of the bent plate around said carrier-wires.

6. A machine for bending thin metal plates and for attaching them to carrier-wires comprising a mandrel having a bore and slot communicating with said bore operable to initially bend the plate and then temporarily hold the same, and means for pressing the ends of the bent plate around said carrier-wires.

7. A machine for bending thin metal plates and for attaching them to carrier-wires comprising a mandrel having a bore and slot communicating with said bore operable to initially bend the plate and then temporarily hold the same, dies movable to bend the initially bent plate around the mandrel, additional dies movable to press the ends of the bent plate around the carrier-wires and cam means for actuating the dies in a direction perpendicular to the direction of movement of the mandrel.

8. A machine for bending thin metal plates and for attaching them to carrier-wires comprising a mandrel having a bore and slot communicating with said bore operable to initially bend the plate and then temporarily hold the same, dies movable to press the initially bent plate around the mandrel, additional dies movable to press the ends of the bent plate around the carrier-wires, slides carrying said dies, and cam means for actuating said slides.

9. A machine for bending thin metal plates and for attaching them to carrier-wires comprising a mandrel having a bore and slot communicating with said bore operable to initially bend the plate and then temporarily hold the same, dies movable to press the initially bent plate around the mandrel, additional dies movable to press the ends of the bent plate around the carrier-wires, slides carrying said dies, and cam means for actuating said slides, said slides being resiliently held in contact with said cams.

10. A machine for bending thin metal plates, used as electrodes in discharge tubes, and for attaching said bent plates to carrier-wires mounted on a glass support on which an electrode has already been mounted, comprising a mandrel having a bore and slot communicating with said bore, the outer surface of said mandrel corresponding with the form into which the plate is to be shaped, said mandrel being provided with a recess for receiving the electrode, which has been mounted on the glass support, and with a slot communicating with said recess for the passage of the supporting-wires of the latter electrode, means for bending the metal plate around the mandrel, and means for pressing the ends of the bent plate around the said carrier-wires.

In testimony whereof I affix my signature, at the city of Eindhoven, this 30th day of November 1923.

HENDRIK DE JONG.